Figure 1:
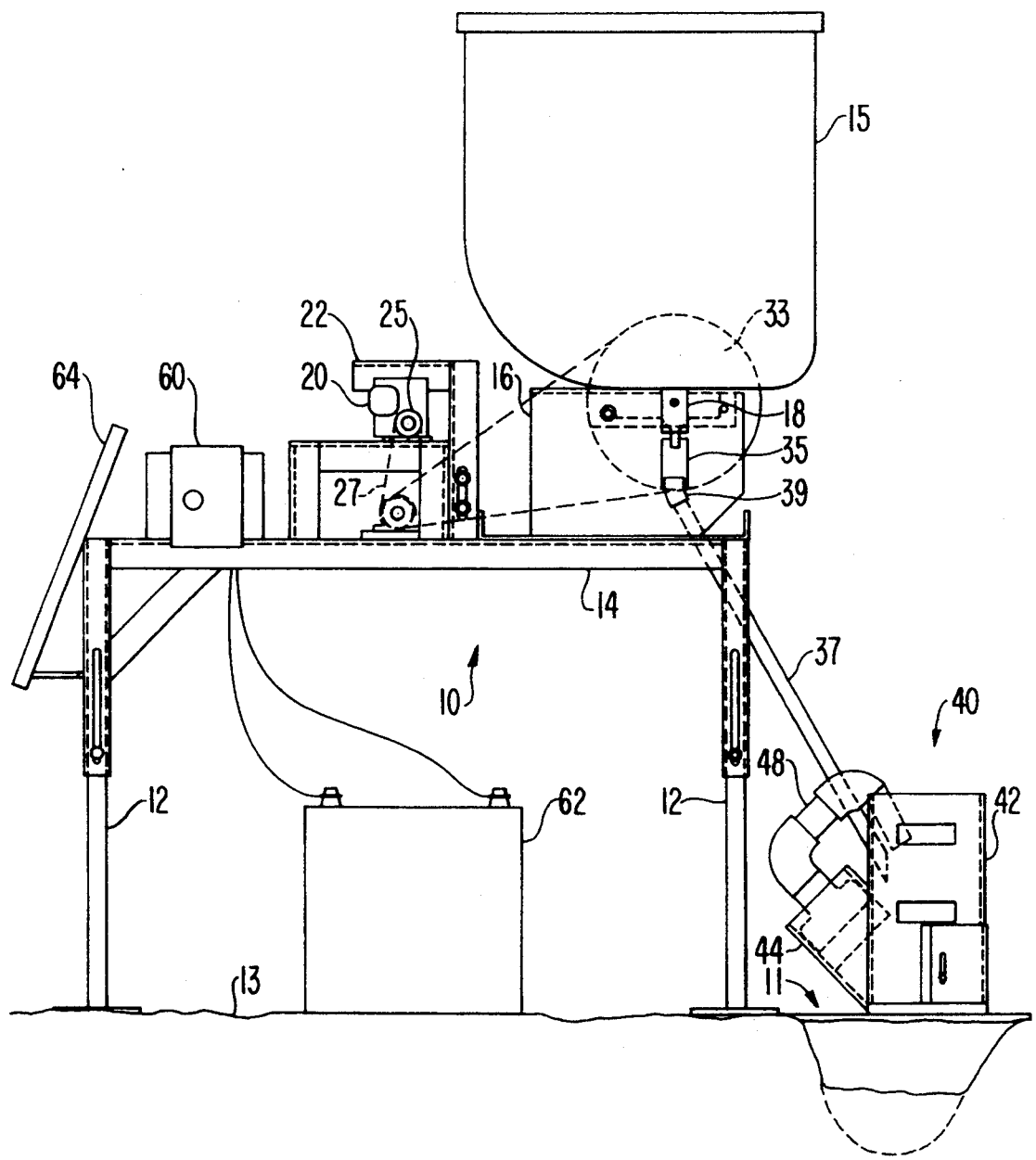

United States Patent [19]

Meuleman

[11] Patent Number: 5,450,985
[45] Date of Patent: Sep. 19, 1995

[54] DISPENSER FOR DRY APPLICATION OF POLYACRYLAMIDE

[76] Inventor: Guy A. Meuleman, P.O. Box 101, Rupert, Id. 83350

[21] Appl. No.: 231,328

[22] Filed: Apr. 22, 1994

[51] Int. Cl.[6] .............................................. B67D 5/08
[52] U.S. Cl. .................................. 222/190; 222/643; 222/185.1
[58] Field of Search ............... 222/190, 185, 631, 643, 222/650, 181, 410

[56] References Cited

U.S. PATENT DOCUMENTS

| | | | |
|---|---|---|---|
| 3,224,647 | 12/1965 | Dietert et al. | 222/190 |
| 3,252,402 | 5/1966 | Burmeister | 222/190 X |
| 3,260,415 | 7/1966 | Minamiyama et al. | 222/190 X |
| 3,269,611 | 8/1966 | Komarek | 222/190 X |
| 3,478,926 | 11/1969 | Pfeiffer et al. | 222/190 X |
| 3,543,970 | 12/1970 | Buchner | 222/190 |
| 4,558,805 | 12/1985 | Margison | 222/190 X |
| 4,793,244 | 12/1988 | King | 222/190 X |
| 5,012,957 | 5/1991 | Mihail | 222/190 |

Primary Examiner—Andres Kashnikow
Assistant Examiner—Kenneth R. DeRosa
Attorney, Agent, or Firm—Walter Co. Farley

[57] ABSTRACT

An apparatus dispenses dry polyacrylamide (PAM), which is very sensitive to humidity, into irrigation water for stabilizing soil to reduce erosion and maintain porosity. A tank containing PAM discharges the PAM into a feed tube leading to a distribution canister. A fan at the canister blows a stream of air across an outlet end of the feed tube to keep moist air away from the end of the tube and facilitate discharge of the PAM into the canister and out of the open bottom end of the canister into the irrigation water. The apparatus is battery powered for use in remote areas without power lines and is operated periodically by a programmable timer.

6 Claims, 6 Drawing Sheets

DISPENSER FOR DRY APPLICATION OF POLYACRYLAMIDE

FIELD OF THE INVENTION

This invention relates to a dispensing apparatus for dispensing dry polyacrylamides in irrigation ditches or furrows for soil stabilization and improved irrigation.

BACKGROUND OF THE INVENTION

In agricultural areas where fields are irrigated by running water into furrows, erosion of the soil is a major problem. While furrow irrigation has significant advantages including water saving and less costly equipment, especially as compared with overhead sprinklers, it also has some disadvantages. In particular, furrow or ditch irrigation causes significant soil erosion as the water running along the furrow washes away soil. In some areas, erosion of topsoil can amount to between 2.8 and 28 tons per acre during a 24 hour watering interval.

In addition, this form of irrigation can remove valuable pesticides and fertilizers which become pollutants in the waterways to which they run, and the soil itself can become less porous, and therefore less able to accept the irrigation water and convey it to plant roots, as fine clay particles settle out of the water and clog soil pores.

It has been found that certain polyacrylamides (PAMs) greatly alleviate these problems and make furrow irrigation a useful and much less destructive irrigation technique, extending the useful life of many acres of farmland. PAMs are long-chain polymers, also used to clean waste water, which reduce the amount of soil carried by the irrigation water and reduces the negative effect of the erosion on soil porosity. Although the mechanism by which this is accomplished is not fully understood, its effectiveness is widely acknowledged.

PAMs are employed in furrow irrigation by adding selected quantities of the substance in a powder-like form to the irrigation water as the water is dispensed or flowed into the field. Unfortunately, before the material is added to the irrigation water, it is highly sensitive to moisture, particularly moisture in the air, i.e., humidity. When the dry polymer is exposed to moisture, it tends to become sticky and agglomerates. As the amount of moisture increases, the substance becomes increasingly sticky and no longer flows as a powder. Any attempt to simply dispense the PAM through a tube under humid conditions results in the tube being blocked by agglomerated PAM in a short interval of time.

Figure 4:
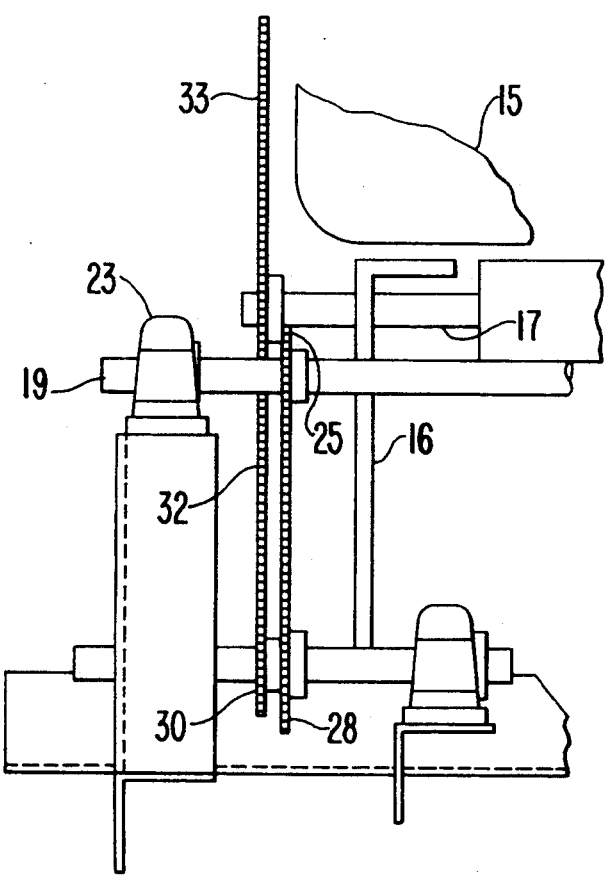

This becomes important because the PAM must be dispensed over and adjacent to the surface of the irrigation water in order to prevent it from being blown away and lost, a dispenser being held as close as one inch to, or as far away as one foot from, the water surface. The proximity of the dispenser to the water creates humidity where it is least wanted, in the dispensing tube.

SUMMARY OF THE INVENTION

An object of the present invention is to provide an apparatus for dispensing polyacrylamide in dry form to irrigation water.

A further object is to provide such an apparatus which dispenses PAM while greatly reducing the agglomerating effect of humidity on the PAM as it is being dispensed.

Yet another object is to provide such a dispensing apparatus which is operable at locations remote from a conventional power source for long intervals of time.

Briefly described, the invention comprises van apparatus for dispensing dry polyacrylamide into a body of water comprising the combination of a canister having an open end and means for supporting the canister over a body of water with the open end facing the water. A supply container of dry polyacrylamide is supported above the canister and a feed tube extends from the supply container to the canister, the feed tube having an outlet end in the canister. Polyacrylamide is discharged from the container into the feed tube. Means including a fan blows a stream of air past the outlet end of the feed tube to blow humid air away from the outlet end and to facilitate discharge of dry polyacrylamide from the feed tube into the canister and through the open end thereof to the body of water.

BRIEF DESCRIPTION OF THE DRAWINGS

In order to impart full understanding of the manner in which these and other objects are attained in accordance with the invention, particularly advantageous embodiments thereof will be described with reference to the following drawings, which form a part of this disclosure, and wherein:

FIG. 1 is a front elevation of an apparatus in accordance with the invention;

FIG. 2 is a side elevation of the apparatus of FIG. 1;

FIG. 3 is a top plan view of the apparatus of FIGS. 1 and 2;

FIG. 4 is an enlarged, partially cut away front elevation of a portion of the apparatus of FIGS. 1–3;

FIG. 5 is an enlarged partial side elevation, in partial section, of a dispensing portion of the apparatus of FIGS. 1–3;

FIG. 6 is a simplified view similar to FIG. 5 in outline only to show air flow patterns therein during operation; and FIGS. 7 and 8 are simplified side elevations, in section, of further embodiments of the invention usable under relatively low humidity conditions.

DESCRIPTION OF THE PREFERRED EMBODIMENTS

Referring first to FIGS. 1–3, which show the general organization of the apparatus, a frame indicated generally at 10 is preferably made of 1.5" angle iron and has legs 12 which are adjustable in length so that the top of the frame can be positioned a desired distance above a supporting surface 13, typically the surface of the earth adjacent an irrigation ditch 11. The top portion 14 of frame 10, which is normally about 2 feet to 3 feet above the surface, supports part of the components of the apparatus for dispensing PAM.

A supply tank 15 is supported above frame top 14 on brackets 16. Tank 15 contains a supply of the PAM to be dispensed, typically about 70 lbs., and is closed to prevent the entry of moisture. At the bottom of tank 15 is an impeller 13, (FIG. 3), which is of a conventional type commonly used to feed granular, particulate or powdery material from a tank or hopper such as in apparatus for discharging fertilizer or the like. The impeller is driven by a shaft 17 which is rotatably supported in one of the tank support brackets 16 and, when the impeller is turned, the powder-like PAM material from the tank passes downwardly through a feed nipple 18 at the bottom of the tank.

A 12 volt DC gearhead motor 20 is supported above frame top 14 on a bracket 22, the output shaft of the motor gearhead being connected to one end of a shaft 19 which is rotatably supported in two bearings 23. Shaft 19 extends to the opposite side of table 10 from motor 20 and carries a chain sprocket 25 attached thereto. A chain 27, such as a conventional bicycle chain, passes around sprocket 25 and an intermediate sprocket 28 on an idler shaft 29 which also carries a sprocket 30, shown most clearly in FIG. 4. A second, similar chain 32 passes around sprocket 30 and drives a larger sprocket 33 mounted on shaft 17. Thus, rotation of motor 20 causes rotation of the tank impeller at a somewhat slower speed, causing PAM material from the tank to be dispensed therefrom through nipple 18 and a short section of flexible hose 35.

Figure 5:
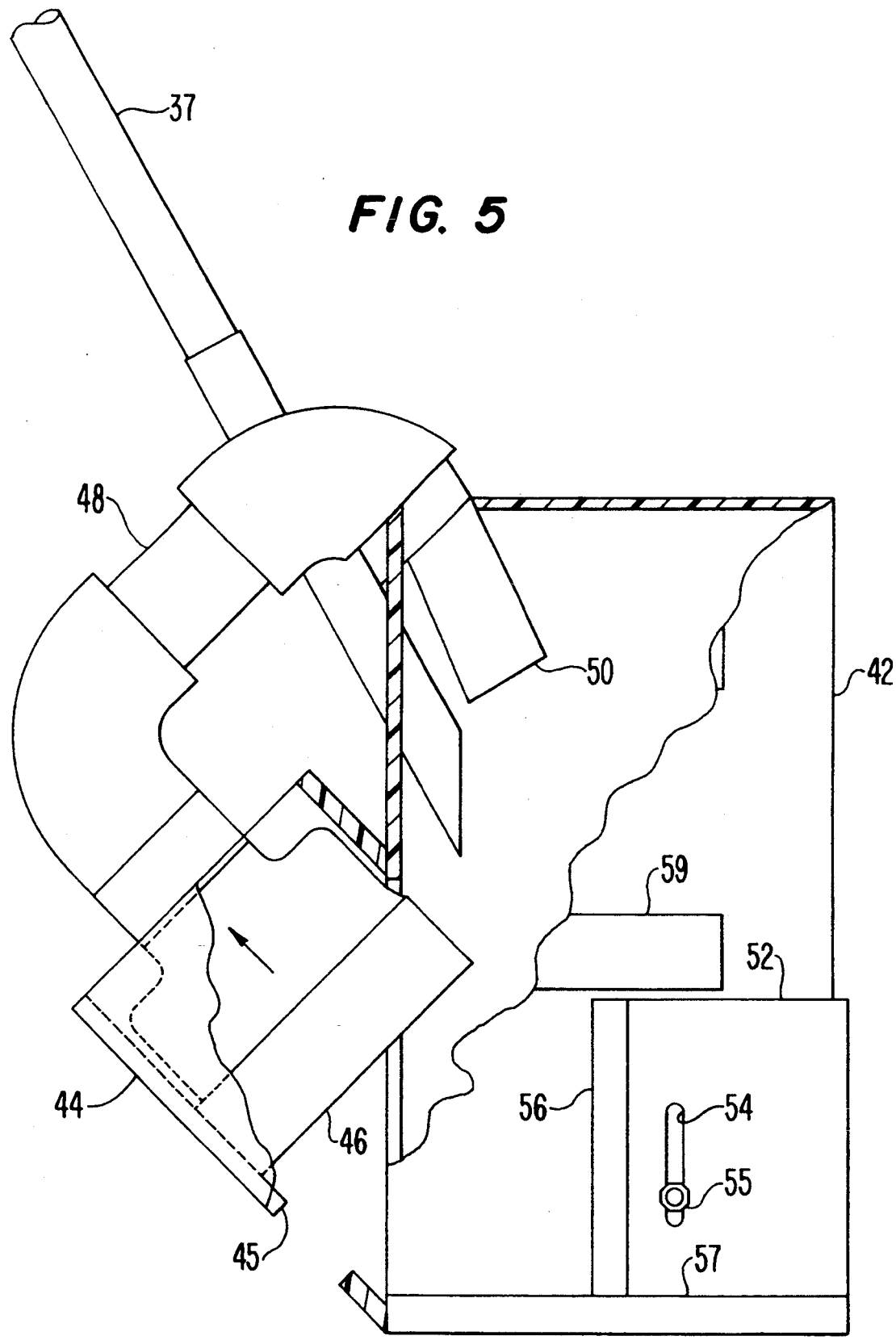
Figure 6:
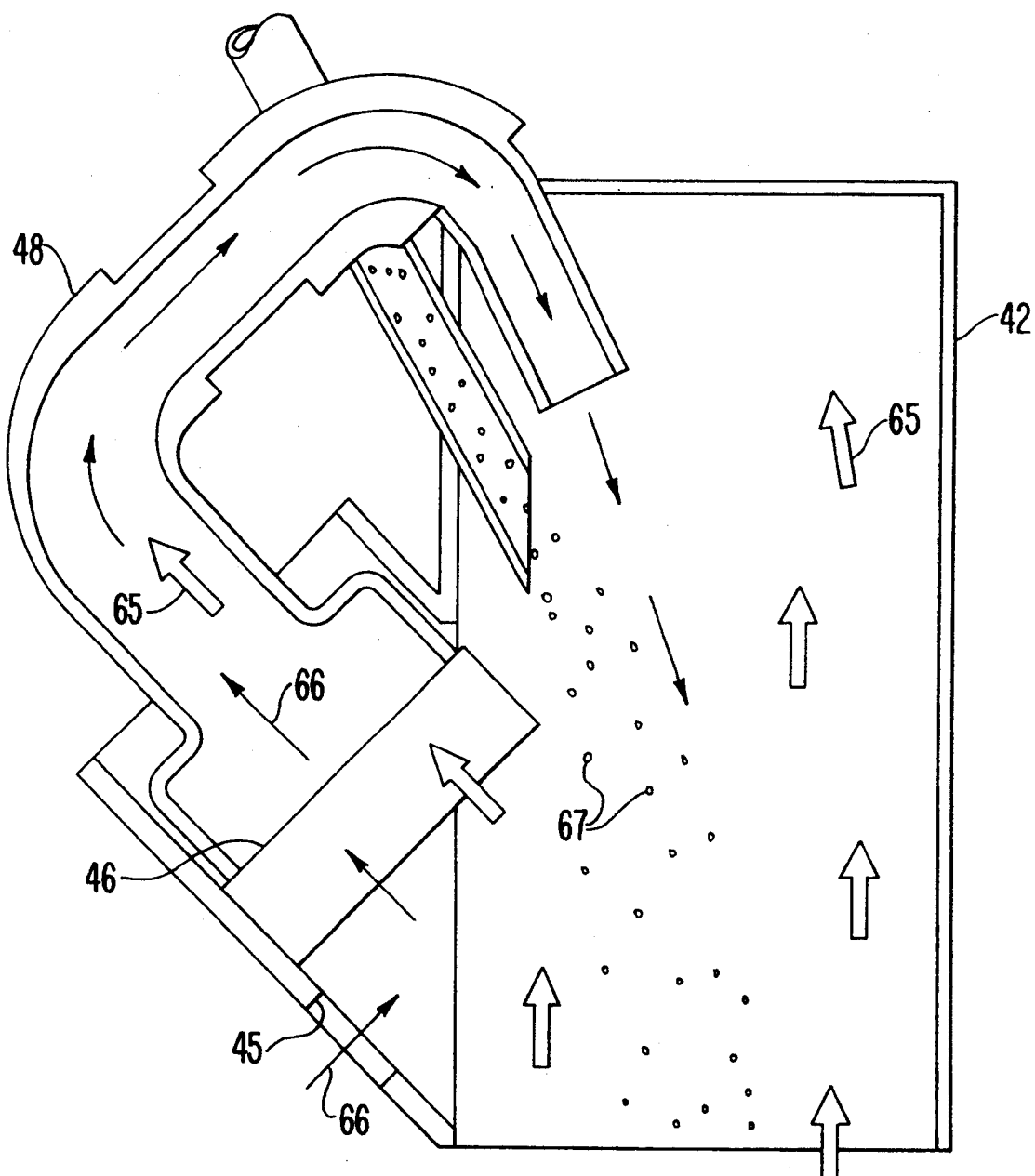
Figure 8:
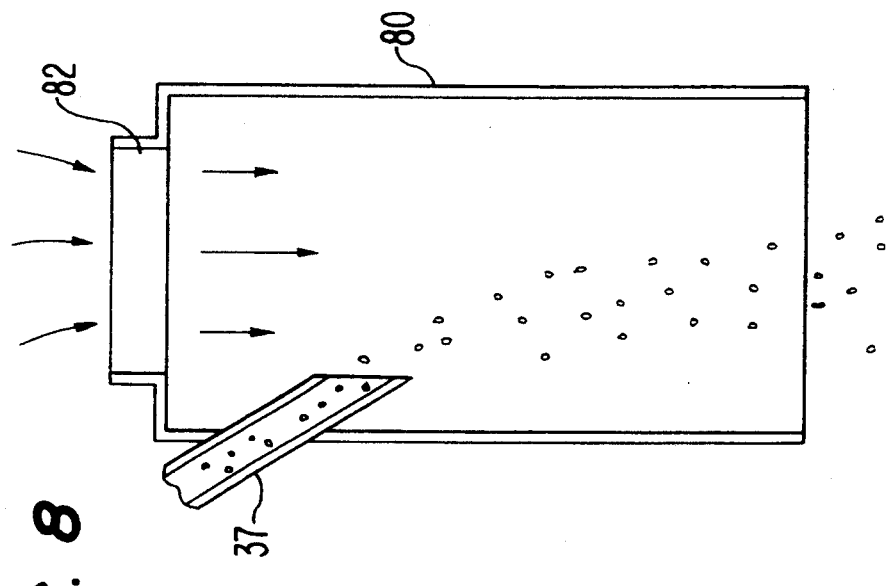
Figure 7:
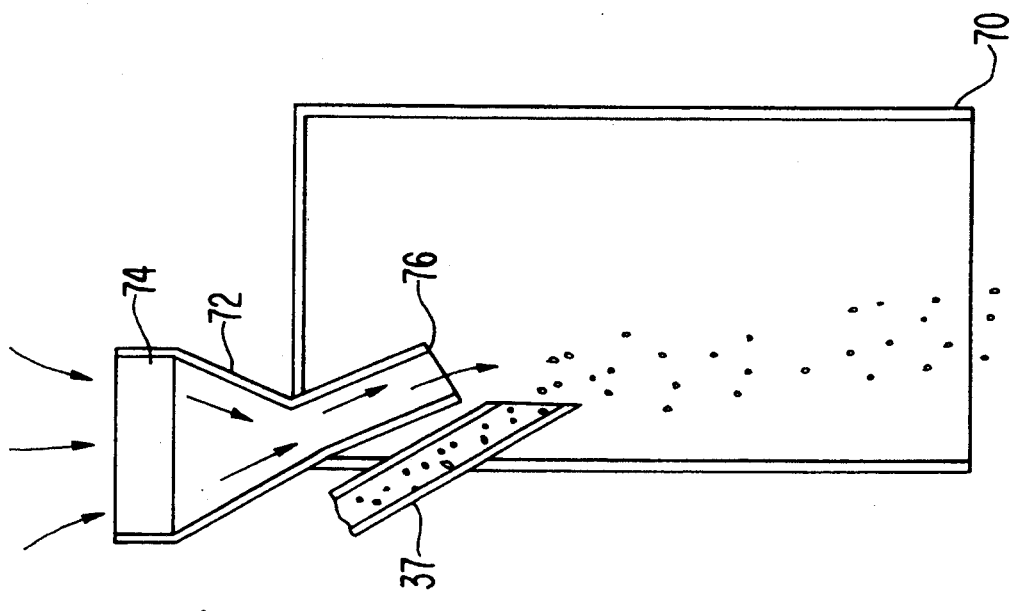

A feed tube 37 is connected to hose 35 by a 45° elbow 39 and carries PAM material from the tank to a dispenser indicated generally at 40. The dispenser is shown more clearly in FIGS. 5 and 6, FIG. 5 showing the mechanical structure of the canister and FIG. 6 showing the flow of air and material therein. Dispenser 40 includes a cylindrical canister 42 which is in the shape of an inverted can about 6" in diameter, closed at the top and open at the bottom. Feed tube 37 passes through the cylindrical wall of canister 42 near the top of the canister and terminates at an open end about 2" inside canister 42. It is important for canister 42 and the associated pipes, etc., to be made of a non-metallic, material having low thermal conductivity, preferably a plastic material such as polyvinyl chloride (PVC), to minimize the amount of condensation on those components.

As best seen in FIG. 5, a cylindrical fan housing 44, also made of PVC, is attached to an opening through a side of canister 42 such that the interiors of canister 42 and housing 44 are open to each other and so that the axes of the canister and housing are at an angle of about 45° from each other. A 12 volt DC brushless fan 46 is mounted in housing 44, the fan being connected so that it draws air in through a D-shaped opening 45 through the wall of housing 44 and also from within canister 42. Fan 46 is about 4" in diameter. A reducer 47 receives air from the fan and delivers it into a sequence of short pipes and elbows, collectively identified as 48, which reverses the flow of air by slightly more than 180° and delivers a flow of air from an outlet end 50 which enters canister 42 near the top thereof and delivers a flow of air from above and passing the outlet end of feed tube 37.

On the outside of canister 42 is a semi-cylindrical mounting sleeve 52 having vertically elongated slots 54 on opposite sides of canister 42 through which screws 55 pass to attach the sleeve to canister 42, permitting vertical adjustment of sleeve 52 relative to the canister. At the ends of sleeve 52 are radially outwardly extending ears 56 and at the bottom of sleeve 52 and ears 56 are oppositely extending mounting flanges 57. Flanges 57 can be used to mount dispenser 40 on a support spanning an irrigation ditch 11 and the adjustment provided by screws 55 and slots 54 permit a user to establish the height of the dispenser relative to the surface of the irrigation water in the ditch.

A plurality of tubes 59 are fixedly attached to opposite sides of the outer surface of canister 42 to provide alternative mounting capabilities.

A programmable 12 volt DC controller 60 is mounted on frame 10 and is electrically connected to motor 20 and the motor of fan 46. A 12 volt battery 62, such as a high ampere-hour automotive battery, is also provided and can be mounted on the frame or placed at any convenient location. The battery is particularly important because the apparatus described herein is intended to be used at locations where no electrical service is available, i.e., at locations in a farm field. A solar panel 64 can also be provided with suitable circuitry to recharge the battery. However, motor 20 requires 1.1 amperes and the fan requires about 0.16 amperes, a total of 1.26 amperes. Thus, the apparatus can be operated for about 85 hours from a 105 ampere-hour battery without recharging. This provides considerable time for irrigating, the actual time in days depending on the number of hours of irrigation each day.

Controller 60 can be a rather simple device, preferably using solid state devices, for controlling the operation of the motors. It includes a clock and switches for energizing the motors at selected times and is also capable of changing the speed of motor 20 from full speed to a lower sustaining rate. The technique preferably used in this form of irrigation is to dispense a selected rate of PAM into the water for a time sufficient to permit the water to flow to the end of the irrigation ditch. By that time, the PAM has coated the surfaces of the ditch and thereafter, for the remainder of this irrigation treatment, it is only necessary to dispense a smaller amount of PAM into the water, typically about 10% of the initial rate. Motor 20 is therefore slowed to a considerably lower speed, reducing the dispensing rate. The on and off times for the motors can be selected as well as the time for changing the motor speed, based on the length of the field to be irrigated.

It is also possible to change the motor drive sprockets. Normally, appropriate sizes for the sprockets are initially chosen on the basis of the acreage of field to be irrigated and would not be changed again for that specific installation. However, it is important to be able to change the sprockets to different drive ratios so that the levels of PAM being dispensed are suitable for the field size and amount of water being used per unit time. For a larger than normal installation, it may be necessary to drive sprocket 33 on shaft 17 directly from sprocket 23 on shaft 19, thereby eliminating the idler sprockets entirely.

FIG. 6 illustrates the function of the fan and the general pattern of air flow which keeps the PAM from agglomerating and clogging feed tube 36. When the process begins, the air in and under the open end of canister 42 is the most humid air, symbolized by the open arrows 65. Fan 46 draws outside air, symbolized by the line arrows 66, in through opening 45 and also from canister 42, drawing humid air away from the outlet end of tube 37. That air is propelled by the fan through pipe 48 and past the open end of feed tube 37, blowing the humid air away from the feed tube and drawing PAM, symbolized by the small circles 67, dispensed from tank 15 into canister 42 where it falls through the bottom of the canister into the irrigation water. The air propelled by the fan thus prevents agglomeration and also has an aspirating effect to propel the PAM powder into the canister. Efforts to accomplish the same thing without fan 46 and pipe 48 resulted in the outlet end of tube 37 being blocked in a few minutes of operation.

In an alternative arrangement, not illustrated, which proved to be satisfactory and has some manufacturing advantages, a hole is made through the elbow leading to outlet end 50 and tube 37 is passed through that opening so that the outlet end of tube 37 is essentially concentric with outlet end 50. The stream of air thus surrounds the material emerging from tube 37, the end of which is recessed a small distance behind end 50 with respect to the direction of air flow.

It is believed that the operation and manner of use will be apparent from the foregoing description. However, the operation can be summarized as follows.

Figure 2:
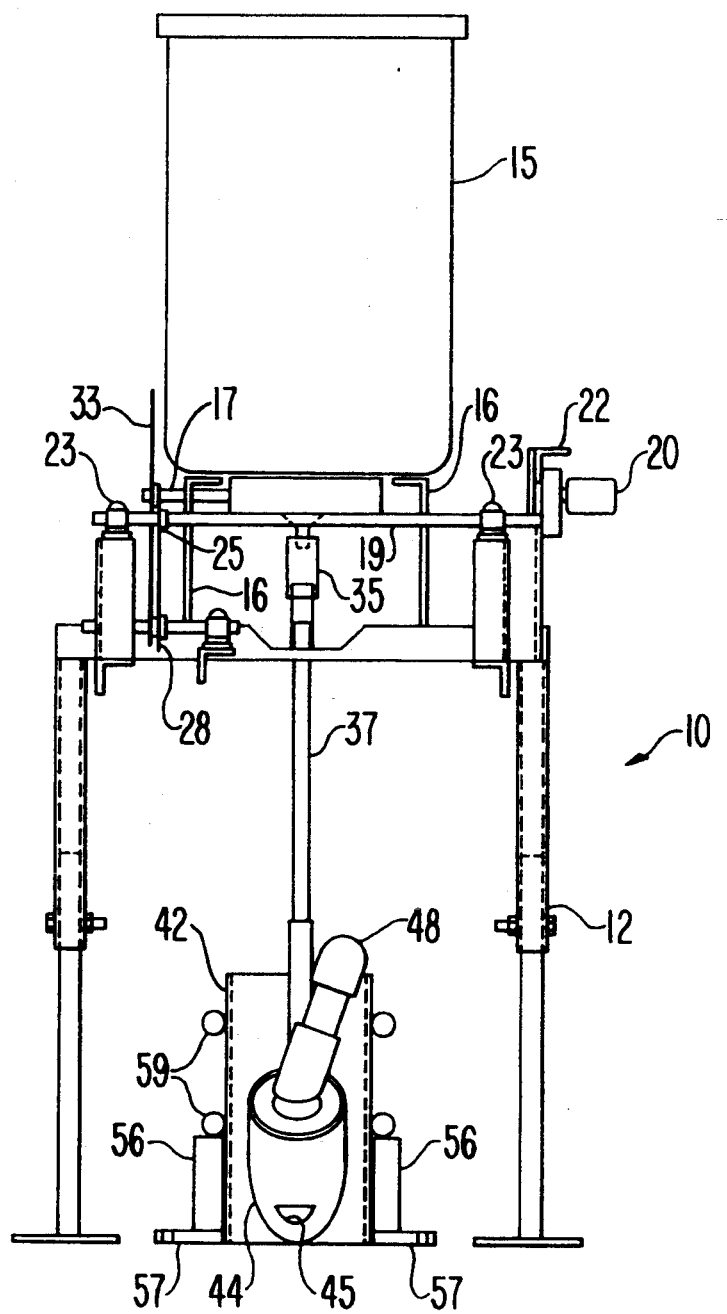
Figure 3:
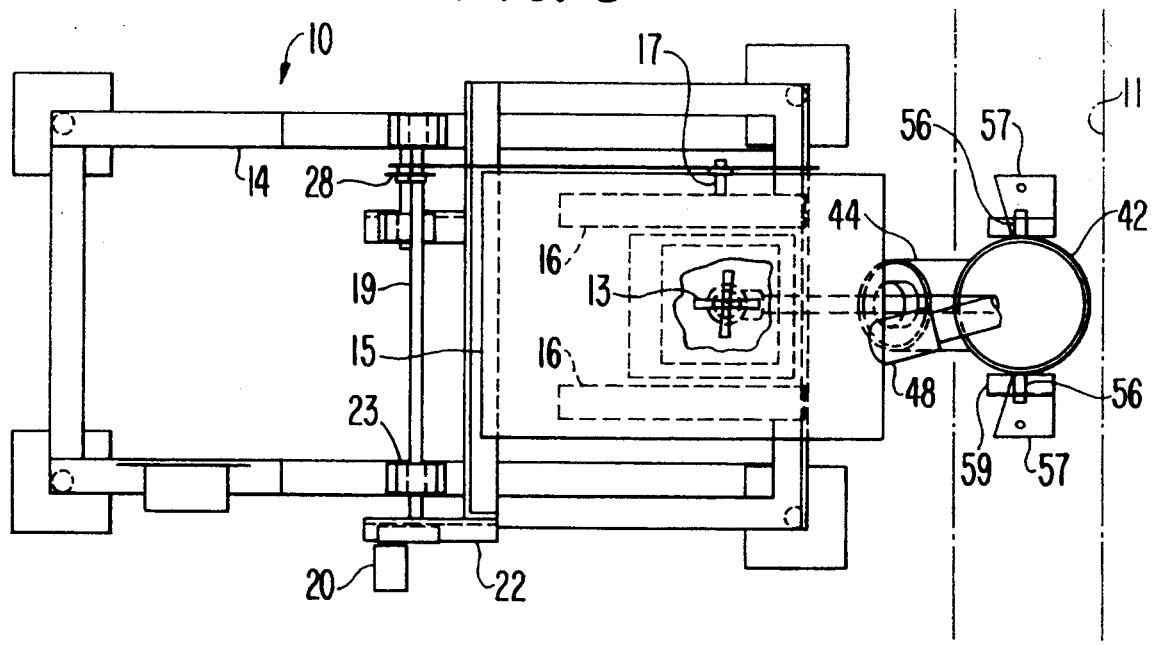

The apparatus is positioned adjacent an irrigation ditch as illustrated in FIGS. 1–3. The ditch may be a ditch leading directly to the crops to be irrigated or may be a ditch feeding other irrigation ditches along which crops are planted. The timer is set to commence irrigation at a selected time each day, to reduce the speed of motor 20 at a certain time after starting, and to stop feeding material at a selected time, coordinated with the desired irrigation times. The interval of time before reduction of motor speed may need to be determined experimentally and will depend on the size of the area being irrigated, recognizing that an entire farm of several fields may be treated from one dispenser. At the selected time, water is fed into the system and the timer turns on, commencing rotation of shaft 17 by motor 20 to discharge PAM from tank 15. At the same time, fan 46 commences air flow through pipe 48, reducing the humidity at the outlet end of tube 37. The PAM is discharged from tube 37 and falls into the irrigation water as it passes under dispenser 40, producing the desired effect.

Alternative embodiments which are usable only in low humidity conditions are shown in FIGS. 7 and 8. The portions of the apparatus not shown are the same as discussed above. In the embodiment of FIG. 7, a dispensing canister 70 is shown in a simplified sectional view. Feed tube 37 enters the canister as with the embodiment of FIGS. 5 and 6. An air stream housing 72 is mounted on the top of housing 70 and contains a fan 72 which draws air in from the outside above the canister and blows a stream of air out of an outlet end 76 which passes the outlet end of the feed tube, assisting with the dispensing of PAM particles.

The embodiment of FIG. 8 includes a housing 80 with a fan 82 mounted in the top thereof. Feed tube 37 enters the canister as described above. The fan blows downwardly, assisting in the dispensing of material into the irrigation water. Again, the embodiment of FIG. 8 is not effective in high humidity conditions for the reasons discussed above.

While certain advantageous embodiments of the invention have been described in detail, it will be apparent to those skilled in the art that various changes and modifications can be made therein without departing from the scope of the invention as defined by the appended claims.

What is claimed is:

1. An apparatus for dispensing dry polyacrylamide into a body of water comprising the combination of
- a canister having an open end;
- means for supporting said canister over a body of water with said open end facing said water;
- a supply container of dry polyacrylamide;
- a feed tube extending from said supply container to said canister, said feed tube having an outlet end in said canister;
- means for discharging polyacrylamide from said container into said feed tube;
- means including a fan for blowing a stream of air past said outlet end of said feed tube to blow humid air away from said outlet end and to facilitate discharge of dry polyacrylamide from said feed tube into said canister and through said open end thereof to said body of water.

2. An apparatus according to claim 1 wherein said means for blowing includes a fan housing connected to said canister and having a fan therein, means defining an opening through said fan housing to admit outside air so that said fan draws air into said fan housing from the outside and from said canister, and a duct from said fan to a location adjacent said outlet end of said feed tube to supply said stream of air.

3. An apparatus according to claim 2 wherein said canister, said fan housing and said duct are made of a non-metallic material to minimize condensation of moisture thereon.

4. An apparatus according to claim 1 wherein said means for discharging includes
- rotatable means in said supply container for causing said dry polyacrylamide to leave said tank through a bottom exit opening;
- a drive shaft connected to drive said rotatable means;
- a direct current motor operable at at least two speeds connected to drive said shaft; and
- a timer connected to said fan and to said motor to operate said motor at a first speed for a first selected interval of time and at a second speed lower than said first speed for a second selected interval of time to thereby dispense polyacrylamide at a first rate for said first interval and at a second lower rate for said second interval.

5. An apparatus according to claim 4 and including a storage battery connected to said timer to provide electrical power to said timer, said fan and said motor.

6. An apparatus according to claim 5 and including means for recharging said battery.

* * * * *